United States Patent [19]
Robbins et al.

[11] 3,722,039
[45] Mar. 27, 1973

[54] PLASTIC ZIPPER/CLOSURE FOR FLEXIBLE CONTAINERS

[76] Inventors: William Paul Robbins, 504 Manchester Rd., Middletown, Ohio 45045; Clifford R. Bullock, 522 Cheshire, Fort Woetan Beach, Fla. 32548

[22] Filed: Feb. 9, 1971

[21] Appl. No.: 113,837

[52] U.S. Cl. ................................................24/201 C
[51] Int. Cl. .............................................A44b 17/00
[58] Field of Search .....24/73 AP, 73 PB, 201 C, 204

[56] References Cited

UNITED STATES PATENTS 1,703,712  2/1929  Aud .................................24/201 C X
3,197,164  7/1965  Hansen .........................24/73 PB UX
3,172,443  3/1965  Ausnit ..........................24/201 C UX

FOREIGN PATENTS OR APPLICATIONS 733,472  2/1944  Germany .............................24/201 C
723,191  2/1955  Great Britain .......................24/201 C Primary Examiner—Donald A. Griffin
Attorney—Harry A. Herbert, Jr. and Arthur R. Parker

[57] ABSTRACT

A series of flexible and elongated plug or rod-like elements installed along one side of the normally zipper-closed seam of a flexible, aircraft engine-container are mated in tight-fitting relation within a series of matching openings formed along the opposite side of the seam to thereby counteract any tendency of the seam to open under stress.

6 Claims, 10 Drawing Figures

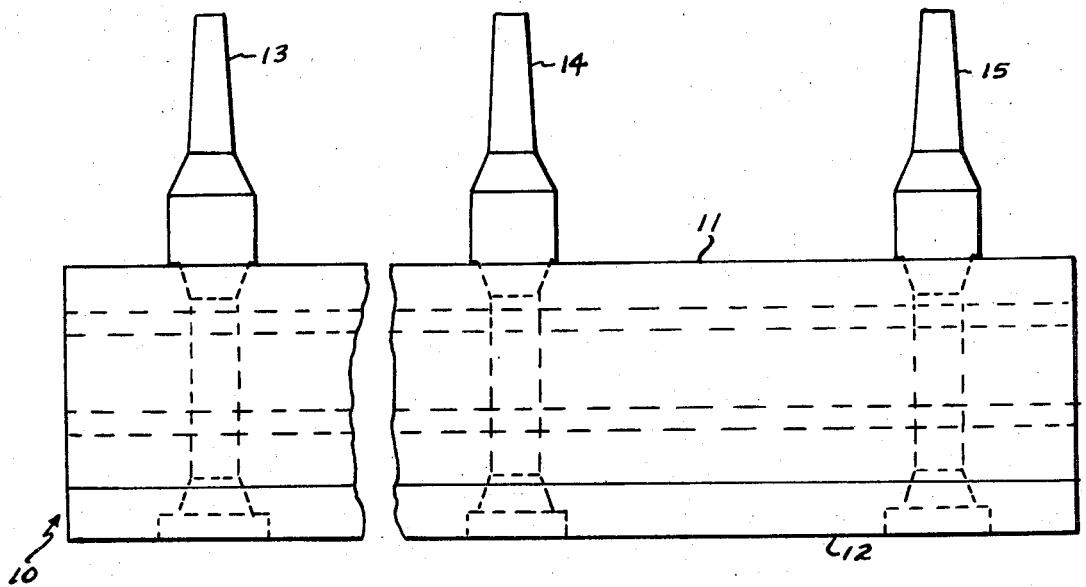
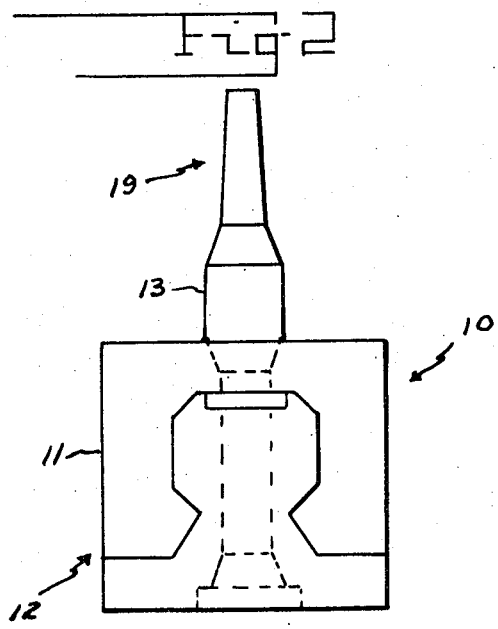
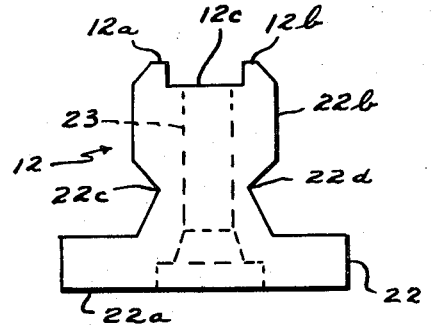

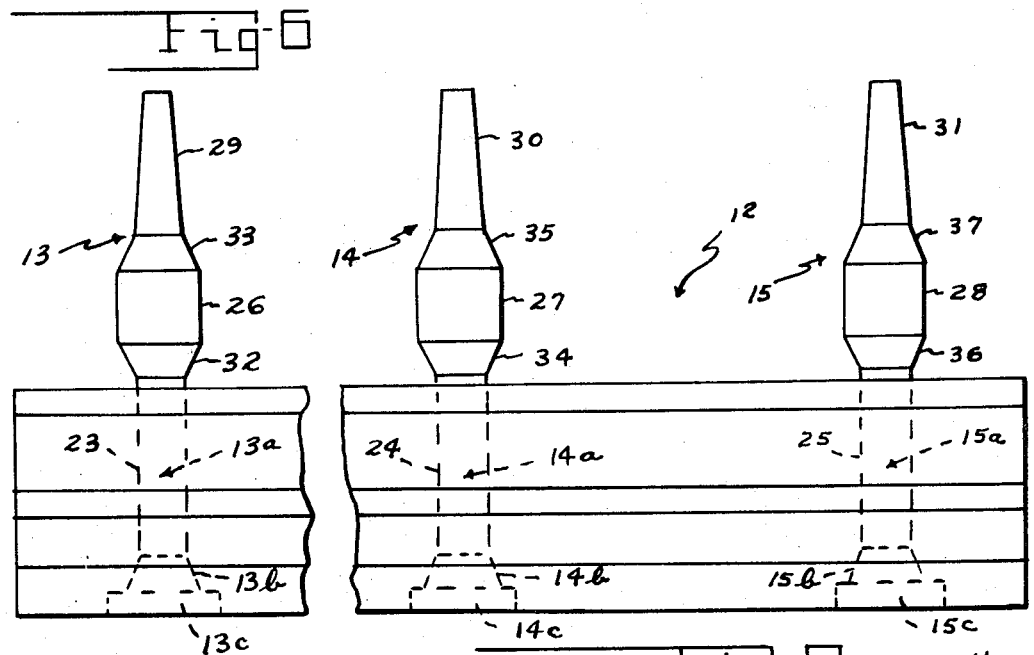
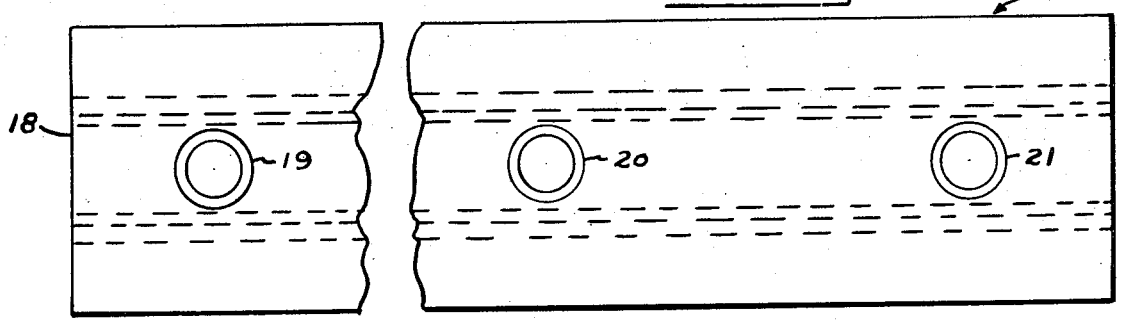
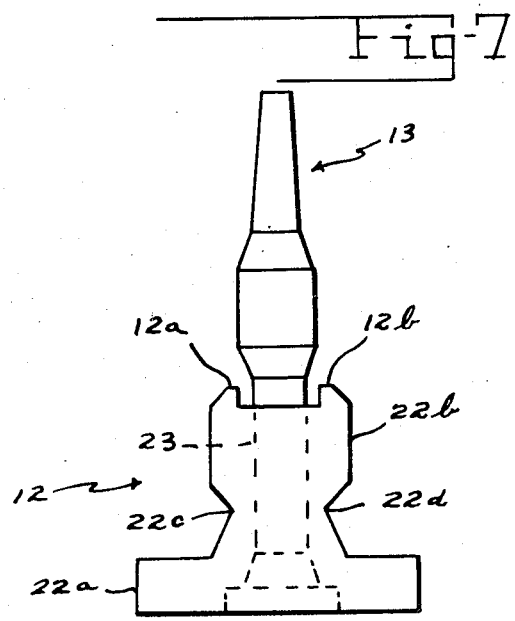

3,722,039

PLASTIC ZIPPER/CLOSURE FOR FLEXIBLE CONTAINERS

CROSS-REFERENCES TO OTHER APPLICATIONS

This application is drawn to an invention that constitutes an improved alternative over the device covered in applicants' co-pending patent application Ser. No. 869,712, filed Oct. 27, 1969, on an invention entitled "Closure Device For Flexible Containers" and subsequently abandoned.

BACKGROUND OF THE INVENTION

This invention relates generally to the field of flexible containers and, in particular, to the zipper closure means for sealing such containers against the surrounding environment.

In the storage and transportation of aircraft engines, for example, flexible-type containers of a plastic barrier material has been used to enclose and protect such engines from contamination by dirt and moisture. These containers may consist, for example, of a bottom portion in which the engine may be nestled, and a top cover portion that is pulled entirely over the engine and thereafter attached or joined to the bottom portion as by means of a plastic-type of zipper. Metal zippers are not preferred because of the many small openings inherently found therein, which openings allow considerable moisture and dirt to enter into the interior of the container.

Although the plastic-type of zipper is clearly a considerable improvement over the metallic zipper, particularly as a means of closing the flexible, aircraft engine-container, because of its inherently tighter and better-sealed seam; nevertheless, the closed seams formed by such plastic zippers have tended to crack and even open under stress conditions, such as may, and do occur, for example, during the handling thereof in wind storms and/or during the movement of the flexible container-enclosed aircraft engines on transportation devices. In this connection, in the previously-referred to and related copending patent application Ser. No. 869,712, the applicants provided one solution to the problem of the cracking and opening of the plastic zipper-seam under stress by using an auxiliary flap which is bonded to the container along one edge of the seam area, and is closed in overlapping relation to the seam by means of a multiple hook fastener along the other edge to thereby mechanically relieve any stress applied thereto. In the present invention, a further improved means for relieving the stress along the aforesaid seam area between the two members of the flexible container is provided in a unique and simplified manner, as will be hereinafter described in the following summary and detailed description thereof.

SUMMARY OF THE INVENTION

The present invention consists briefly in incorporating a plurality of elongated rubber/plastic rod-like elements evenly spaced at predetermined intervals along one side of the plastic zipper-seam area of an aircraft engine-enclosing flexible-type plastic container constituting a male closure member for respective insertion in matching relation in a series of similarly spaced, openings incorporated along the opposite side of the said seam area and constituting a female closure member. Each of the said rod-like elements is snap-fitted in its respective opening by being initially stretched to a temporarily-reduced diameter for relatively easy insertion therethrough. Thereafter, termination of the stretching action thereon results in a return of the respective rod-like element to its initial, unstretched diameter to thereby provide a substantial and positive holding and sealing interconnection between the said male and female closure members.

BRIEF DESCRIPTION OF THE DRAWINGS

FIG. 1 is an overall assembly view, in side elevation, of the improved flexible container-closure mechanism of the present invention;

FIG. 2 is an end view of the assembly of FIG. 1, illustrating details of the unique interconnection between the male and female closure members of the inventive flexible container-closure mechanism;

FIGS. 3, 4, and 5 respectively represent side-elevational, top and end views illustrating details of the male closure member of the invention, with the novel male, flexible plug or rod-like elements thereof omitted therefrom;

FIGS. 6 and 7 represent other side elevational, and end views of the male closure member of the invention, illustrating details thereof with the novel male plug or rod-like elements shown installed therein; and FIGS. 8, 9, and 10 respectively illustrate side-elevational, top and end views, showing details of the female closure member of the invention.

DESCRIPTION OF THE PREFERRED EMBODIMENT

Figure 3:
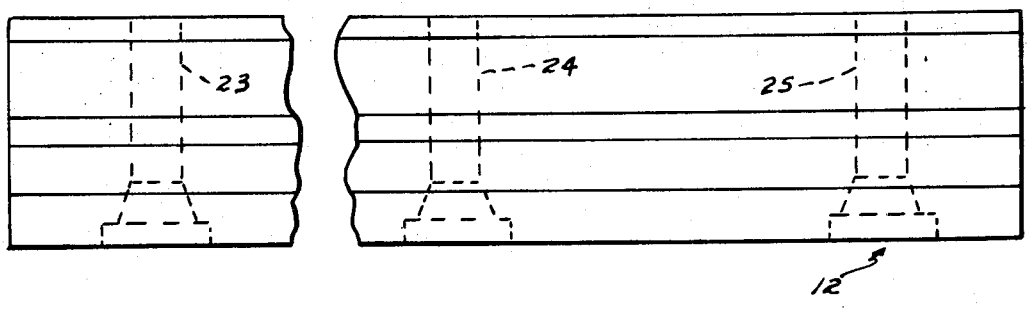
Figure 4:
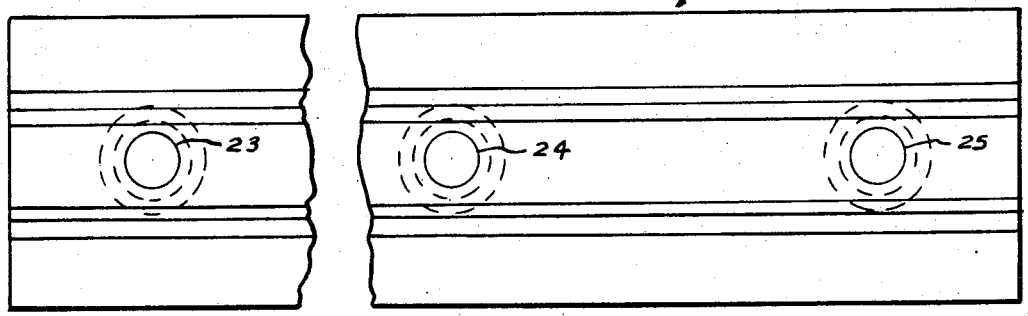
Figure 8:
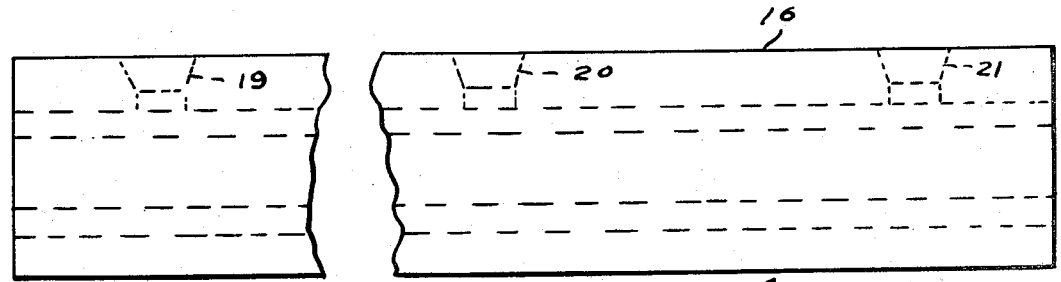

Referring to the drawings and, in particular, to FIGS. 1 and 2 thereof, the unique flexible container-closure mechanism of the present invention is indicated generally at 10 as principally including a female, flexible container-closure member at 11, a male, flexible container-closure member at 12, and a plurality of relatively elongated, flexible, plug or rod-like elements interconnected therebetween, as for example, those indicated at 13, 14 and 15. As seen more particularly in FIG. 10, the female, flexible container-closure member 11 includes a flat top surface at 16, and a pair of parallel and spaced-apart, depending side-supporting elements at 17 and 18. which may be collectively formed into a "C"-shaped configuration as shown. A plurality of plug element-receiving openings may be uniquely incorporated in, and extend entirely through the flat top surface 16 of the said female, flexible container closure member 11. Three of the said openings are illustrated at 19, 20 and 21, respectively, in FIGS. 8 and 9, for example. Said female closure member-openings 19, 20, 21 may be spaced at even intervals along the circumference thereof.

With specific reference to FIGS. 3, 4, 5, and 7 the male, flexible container-closure member is indicated generally at 12 as consisting, in part, of a main, enlarged diameter-body portion at 22 which may incorporate a flat bottom surface at 22a and a relatively reduced-diameter, intermediate body portion at 22b that extends in upright relation on, and relative to, said flat bottom surface 22a. Said upright-extending, intermediate body portion 22b is seen clearly in FIG. 5 as terminating in a pair of spaced-apart upraised, supporting seam elements at 12a and 12b, which provide therebetween a flat, recessed portion at 12c, in which are positioned the upwardly-opened ends of a plurality of relatively elongated plug-element-receiving and mounting openings, indicated, for example, at 23, 24, and 25 in the aforesaid FIGS. 3 and 4.

Figure 10:
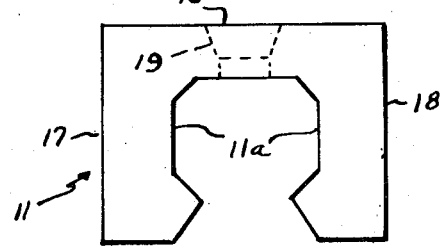

The above-noted, upright-extending intermediate body portion 22b of the male, flexible container-closure member 12 may be further provided with oppositely-disposed, cut-out portions, indicated at 22c and 22d as extending inwardly towards each other, and is otherwise specially configured, as clearly illustrated, to specifically interfit within an open space of similar configuration, seen particularly at the reference numeral 11a in FIG. 10 as being formed between, and by the previously-described side-supporting elements 17 and 18 of the aforementioned female closure member 11. With this unique arrangement, the female and male closure members 11 and 12 may be specifically and initially united together in an improved manner.

Although the above-described specific interfitting relation provided between the upright, intermediate body portion 22b of the male closure member 12 and the specifically-configured open space 11a between the depending side-supporting elements 17 and 18 of the female closure member 11 constitutes an improved feature of the present invention, the aforementioned male closure member 12 is still further improved by the incorporation, or installation in snug-fit relation within the previously-noted, plug-receiving and mounting openings 23, 24, and 25 thereof of the plug or rod-like elements 13, 14 and 15, previously-described with specific reference to the assembly of FIG. 1. As depicted more clearly in FIGS. 6 and 7, said plug elements 13, 14, 15 each incorporate a main, relatively elongated and straight plug element-portion, indicated at 13a, 14a, and 15a, respectively; a relatively small, outwardly tapered plug element-portion respectively at 13b, 14b, and 15b, and a squared-off and lowermost, interlocking plug-element portion at 13c, 14c, and 15c, respectively. The latter elements 13c, 14c, 15c provide a positive hold to the lower ends of the plug elements 13, 14 and 15 when the latter have been assembled to the female closure member 11, in the manner to be explained in detail hereinafter. Of course, the previously-referred openings 23, 24, 25 are of the same size and configuration as the above-described lower portions of the plug elements 13, 14, and 15 and, as such, ensure the aforementioned snug-fit relation therebetween.

The said male plug elements 13, 14 and 15, which may be made of a suitable plastic or rubber, may each be respectively provided with a relatively enlarged, intermediately-disposed, female closure member-main attaching and sealing section respectively indicated at 26, 27 and 28, and a relatively reduced-diameter and elongated upper, hand-gripping end portion at 29, 30 and 31. As illustrated in FIG. 6, said upper ends 29, 30, 31 may each be tapered both to facilitate the insertion thereof into the respective female closure member-openings 18, 20, 21 and the gripping thereof by the human hand during its assembly to the said female closure member 11. To integrally interconnect said enlarged, main attaching and sealing sections 26, 27 and 28 and said upper, hand-gripping end portions 29, 30 and 31, the male plug elements 13, 14 and 15 each may incorporate downwardly and upwardly tapered, plug sections, indicated respectively at 32 and 33, 34 and 35, and 36 and 37. As noted, these plug sections are tapered as shown to thereby facilitate both the insertion and interconnection of the plug elements 13, 14 and 15 in their respective female closure member-openings 19, 20 and 21. In this connection, the said openings may likewise be appropriately tapered to further facilitate the accommodation therewithin of the appropriate sections of the aforesaid male plug elements 13, 14 and 15. Furthermore, the diameter of the said female closure member-openings 19, 20, and 21 is relatively reduced and so related to the diameter of the said male plug elements to thereby ensure a press-fit and thus positive hold therebetween.

The above-described female and male closure members 11 and 12 may be fully assembled and positively attached to each other, as is illustrated in FIGS. 1 and 2, by initially inserting the tapered upper ends 29, 30, 31 of the male plug elements 13, 14 and 15 into the female closure member-opening 19, 20 and 21 corresponding thereto, and thereafter grasping and thereby longitudinally stretching each of said male plug elements. The latter action results in a temporary reduction in the diameter of each male plug element 13, 14 and 15 which enables it to then be relatively easily press-fed through the mating female closure member-opening to its fully seated position with the lower end portion of the aforementioned, enlarged main attaching and sealing plug element-sections 26, 27 and 28 thereby resting against the upper end of the respective female closure member-opening. When the applied stretching force is removed, the diameter of each of said male plug elements 13, 14 and 15 will automatically increase into a tight-fitting relation, or, in other words, will snap fit against and within the respective female closure member-opening to thereby uniquely provide a positive holding and sealing joint between the said openings 19, 20 and 21 and the enlarged, main attaching and sealing sections 26, 27 and 28 of the male plug elements 13, 14 and 15 corresponding thereto.

We claim:

1. An improved plastic zipper-type of flexible container adapted to enclose an aircraft engine or other object therewithin and comprising; a flexible, female container-closure portion; a flexible, male container-closure portion adapted to be joined to said female container-closure portion along a zipper-like seam area extending therebetween; and releasable means interconnecting said female and male container-closure portions in tightly sealed, dirt-proof and water-tight relation along said seam area to thereby prevent contamination of the interior of said container; said means comprising a plurality of interconnecting and weather-tight, plug elements attached between said male and female, flexible container-closure portions at spaced intervals along the seam area thereof; said plug elements comprising relatively elongated, rod-like members fixed at one end thereof to said male, flexible container-closure portion and releasably interconnected at the other end thereof to said female, flexible container-closure portion.

2. An improved plastic zipper-type of flexible container as in claim 1, wherein the ends of said rod-like members attached to said male, flexible container-closure portion may be releasably positioned in snug-fit relation in a series of openings incorporated in said male closure portion.

3. An improved plastic zipper-type of flexible container as in claim 2, wherein said female, flexible container-closure portion may incorporate a series of matching openings disposed along the seam area thereof in direct alignment and releasably engageable with the said plurality of flexible, rod-like members attached to said male, flexible container-closure portion.

4. An improved plastic zipper-type of flexible container as in claim 3, wherein said plurality of rod-like members may be comprised of stretchable material and incorporate tapered, upper end portions adapted to be grasped by the human hand, after their initial insertion through said female closure portion-matching openings, for subsequent stretching upwardly through said openings for their releasable attachment to said female, flexible container-closure portion.

5. An improved plastic zipper-type of flexible container as in claim 4, wherein each of said plurality of rod-like members incorporates female, flexible container-closure portion-holding and sealing means releasably engageable in weather-tight relation within, and relative to, the plurality of matching openings incorporated in said female, flexible container-closure portion during the stretching of said plurality of rod-like members upwardly through said openings.

6. An improved plastic zipper-type of flexible container as in claim 5, wherein said holding and sealing means may comprise a relatively enlarged, resilient and intermediately-positioned integral body portion of each of said plurality of rod-like members.

* * * * *